Aug. 16, 1966   M. G. BROWN   3,266,720
APPARATUS FOR DETERMINING VALUES OF
COMPONENTS OF WHOLE BLOOD
Original Filed July 14, 1959   2 Sheets-Sheet 1
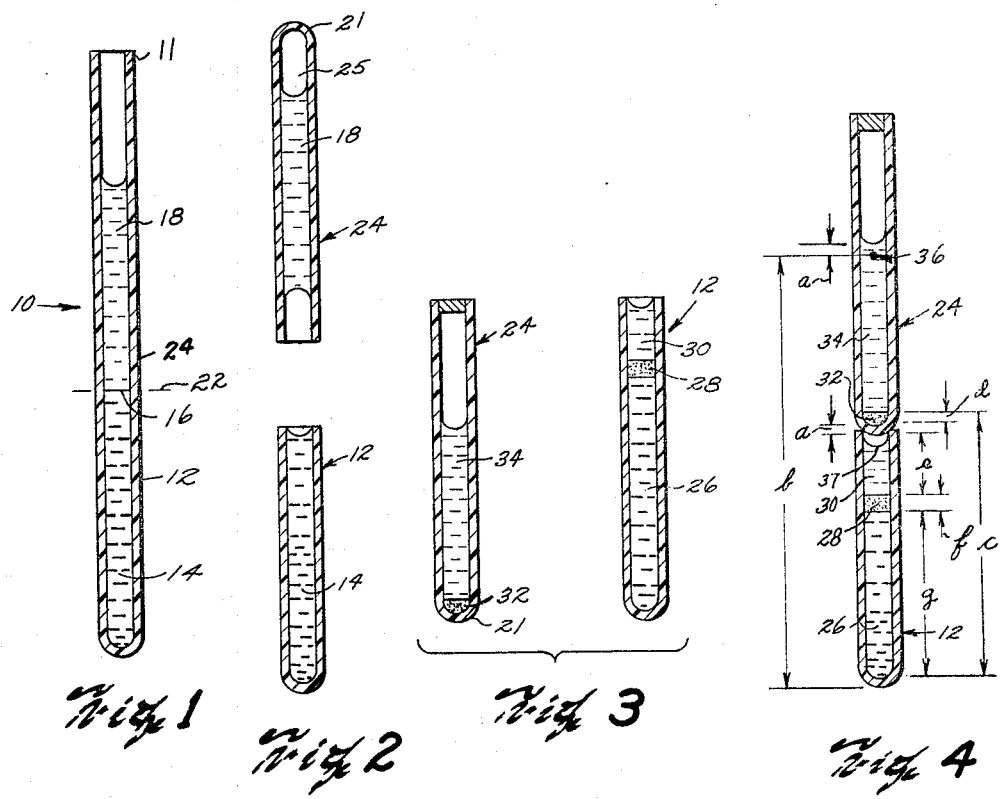
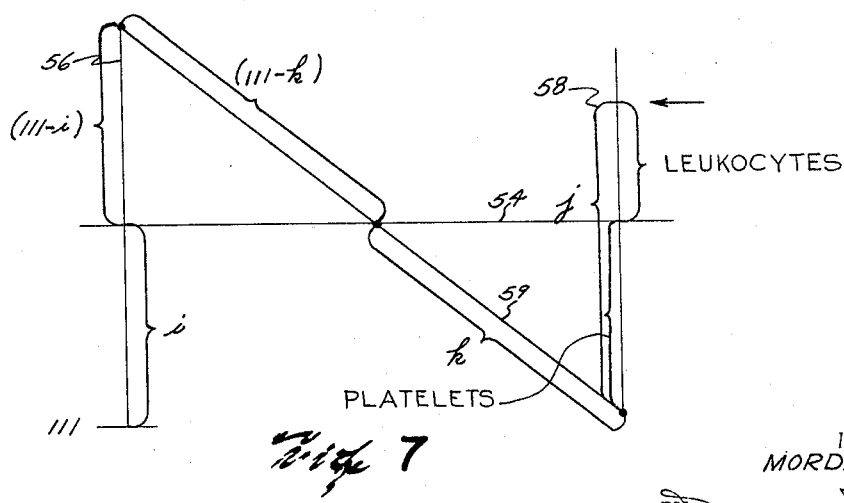
INVENTOR.
MORDEN G. BROWN
BY
Noble S. Williams
ATTORNEY Aug. 16, 1966  M. G. BROWN  3,266,720
APPARATUS FOR DETERMINING VALUES OF
COMPONENTS OF WHOLE BLOOD
Original Filed July 14, 1959  2 Sheets-Sheet 2
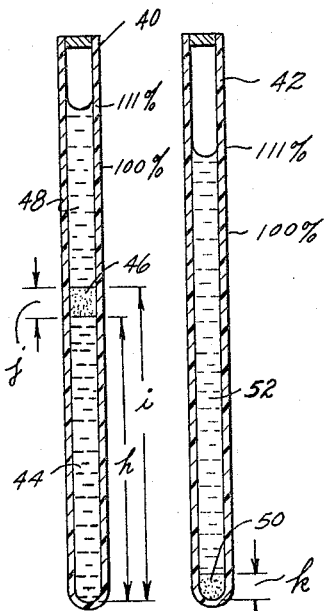
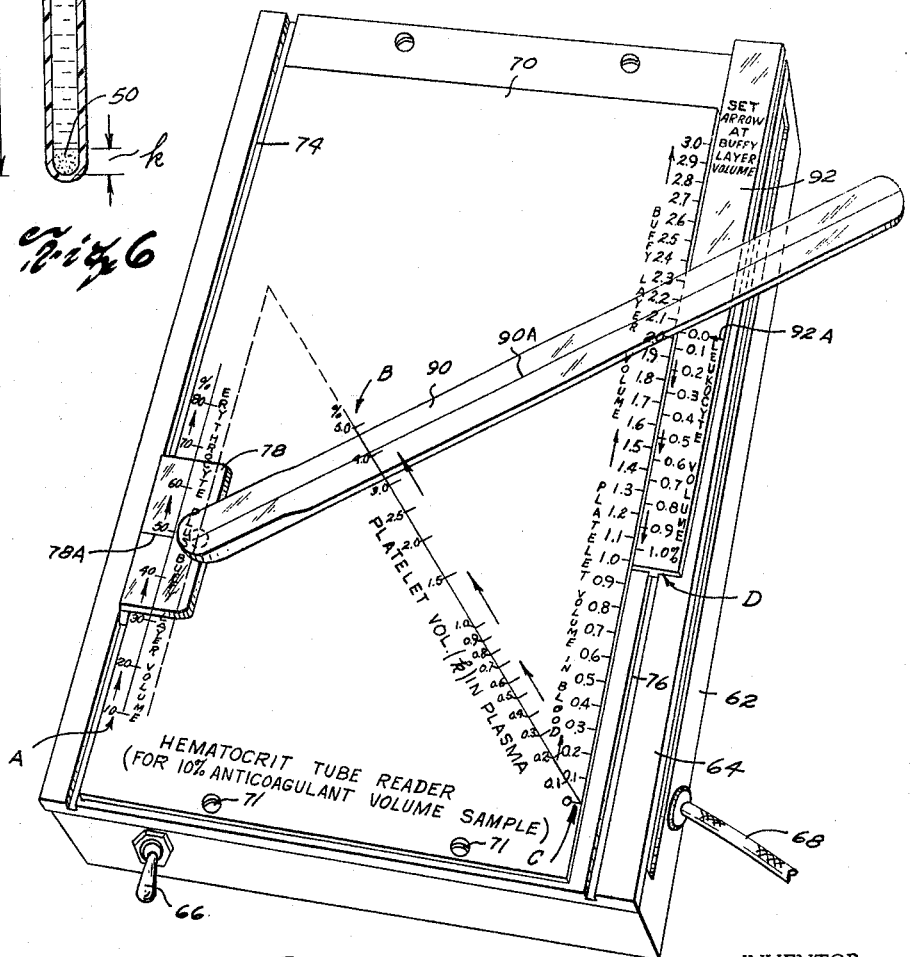
INVENTOR.
MORDEN G. BROWN
BY
*Noble T. Williams*
ATTORNEY

United States Patent Office 3,266,720
Patented August 16, 1966

3,266,720
APPARATUS FOR DETERMINING VALUES OF COMPONENTS OF WHOLE BLOOD
Morden G. Brown, Woodstock, Conn., assignor to American Optical Company, Southbridge, Mass., a voluntary association of Massachusetts
Original application July 14, 1959, Ser. No. 826,941. Divided and this application Aug. 7, 1964, Ser. No. 388,174
5 Claims. (Cl. 235—61)

This invention relates to apparatus for use in rapidly and accurately determining the relative volumes of leukocytes and platelets contained in a sample or specimen of whole blood, and is a division of my copending application Serial Number 826,941, filed July 14, 1959.

It is common practice in diagnostic work in many hospitals at the present time to determine the relative volume of erythrocytes (red blood cells) contained in each sample of whole blood, and one way in which such a determination may be carried out (after a small known quantity of an anticoagulant has been added to the sample) is by centrifuging the sample in a microhematocrit tube at a relatively high speed for a period of time sufficient to separate the red cells from the other components of the blood sample and compact same in one end of the tube. Thereafter, the height of the column of red cells in the tube and the total height of the sample in the tube are measured and from such variable measurements, the percentage volume of erythrocytes may be obtained. In fact, these measurements may be easily and accurately made by use of microscopic apparatus of the type disclosed in copending Brown application Serial No. 763,083, now U.S. Pat. No. 2,973,580, which is arranged to sight directly upon the centrifuged sample in the tube and to indicate directly upon a scale of the apparatus an indication of the percentage volume of the erythrocytes present therein.

It has now been found that additional valuable diagnostic information can be obtained from a sample of whole blood when the relative amounts of leukocytes and platelets present in such a sample can also be accurately determined. Accurate determination of such values heretofore, however, has been a difficult and time-consuming problem. This has been due at least in part to the fact that normally both the leukocytes and platelets are contained in a blood sample only in relatively small proportions, and, additionally, because leukocytes and platelets are not easily separated from each other or from other components of the sample. Furthermore, an important consideration in the problem of obtaining leukocytes and platelets percentage determinations is the fact that the amounts of leukocytes and of platelets in a sample are often much less than normal when the blood sample is taken from a patient in a critical condition; and it might very well be that such a patient would be the one who is actually in the greatest need of an accurate determination of these smaller blood values.

The problem of accurately obtaining an indication of the relative values of these small amounts of leukocytes and platelets from a sample of whole blood has not been an easy one. It has been found, however, that by use of the apparatus disclosed herein and by following the teachings of the present invention, it is possible to quickly and accurately determine values for the relative volumes of the leukocytes and of the platelets of a blood sample; and even to be able to obtain such information when using no more than a drop or so of blood, if necessary.

It is, accordingly, an object of the present invention to provide apparatus for use in obtaining an accurate indication of the relative percentage volumes of leukocytes and of platelets contained in a sample or specimen of whole blood; and to be able to obtain these values in an easy, rapid and inexpensive manner.

It is also an object of the present invention to be able to obtain said leukocyte and platelet information utilizing only a very small quantity of blood and without the need of expensive apparatus or the need of a complicated method or procedure.

Other objects and advantages of the invention will become apparent from the detailed description which follows when taken in conjunction with the accompanying drawing in which:

FIG. 1 is an enlarged diagrammatic vertical sectional view of a microhematocrit tube containing a sample of blood for use in performing steps in the method of the invention;

FIG. 2 is a diagrammatic view like FIG. 1 but showing the microhematocrit tube following sealing and severing steps of the method;

FIG. 3 is a diagrammatic view of the tube sections following high-speed centrifuging of the sample therein;

FIG. 4 is a similar view showing said tube sections in position for precision measurements of the contents thereof;

FIGS. 5 and 6 show a pair of microhematocrit tubes somewhat like the tube in FIG. 1 but for use in carrying out a modified form of the method;

FIG. 7 is a view showing a nomogram for use in showing how the numerical values for leukocyte and platelet values for the sample may be related; and FIG. 8 is a reader arranged for use in obtaining numerical values for leukocyte and platelet volumes of samples in a rapid and accurate manner.

Referring to the drawings in detail and particularly FIG. 1, it will be seen that a standard microhematocrit tube (75 mm. x 1½ mm. O.D.) which is capable of holding approximately .3 milliliter liquid is indicated at 10 and within this tube is contained a sample or specimen of whole blood to which has been added and mixed 10% by volume of a liquid anticoagulant, and which tube has thereafter been centrifuged at a relatively slow speed. It follows that the total volume of liquid in the tube will be 111.1% relative to the volume of the initial specimen of whole blood. (A suitable anticoagulant for the purpose is a sodium or potasisum salt of ethylenediamine tetraacetic acid commonly designated by the letters EDTA or by the trade name Sequestrene. This material is preferred since it acts as a platelet preservative as well as an anticoagulant.)

Although 10% by volume of liquid anticoagulant solution has been used in this description, it should be clearly understood that any other convenient value within a wide range could as well have been used provided proper adjustments are made for the actual percentage used during the measuring of the component portions of the sample. Of course, a satisfactory anticoagulant solution would have to be adjusted in known manner as to its salt composition, as by sodium chloride, so that the osmotic pressure will be balanced and the blood cells of the sample will not change in size when anticoagulant solution is mixed with the blood sample.

The slow centrifuging of tube 10 is preferably performed in a slow speed centrifuge using a standard microhematocrit head arranged to receive the capillary tubes 10 at a speed of approximately 1200 to 1800 r.p.m. for a period of from three to four minutes; the speed and duration of the centrifuging being sufficient to cause substantially all of the red and white cells to move into the outer end of the tube, the lower end portion 12 of the tube as shown in FIG. 1. The platelets, however, will not separate out of the plasma at this speed. Thus, most of the platelets will be contained in suspension in the plasma in the upper tube part, at this time. The mixture in the lower part is indicated by numeral 14 below the division line 16 and, above the division line 16, will be contained the suspension as indicated by the numeral 18. Most of the liquid anticoagulant will be contained in the upper part of the tube 10 since it acts to dilute the plasma and combine chemically with certain components of the plasma of the blood as soon as it is added to the specimen. (If a dry anticoagulant were used instead of the liquid mentioned above, the volume of the sample would not be materially increased.)

The upper end 11 of the tube 10 is sealed either before or after the slow centrifuging of the specimen and preferably this sealing is done by use of a small gas flame. The slow centrifuging just mentioned is done about a vertical axis and the tube or tubes for holding the specimens will be placed in the centrifuge with their inner ends raised. The amount by which they are raised may be such that the axis of each tube will be substantially parallel to the component of force resulting from both the usual pull of gravity and the centrifugal force created by the apparatus combined. Or even a somewhat greater amount might be used if a more rapid rate of separation is desired. This initial centrifuging at slow speed is essential in order to separate or settle out the red and white cells of the sample from the major portion of the plasma thereof but without causing any material settling of the platelets of the sample.

After slow centrifuging and sealing of the tube 10, the tube is scratched at a point slightly above the division line 16 as indicated by dotted line 22, so that the tube may then be broken at this point into two parts. Since flame-sealing of the upper part 24 of the tube has been used, no material will be lost from the upper part since a rarified condition or slight vacuum will exist at the upper end of the tube and thus the entrapped air at 25 above the solution 18 will draw this liquid away from the broken end of this tube section.

These two severed tube portions 12 and 24 are then placed in a centrifuge and rotated at a relatively high speed (in the neighborhood of 12,000 r.p.m.) for a period of approximately four to five minutes so that a more complete stratification as indicated in FIG. 3 will be produced in each tube part. It will be seen that all of the erythrocytes or red cells in tube part 12 will have been driven into and compacted in the lower end of the tube, as indicated by column 26, and above red cells column 26 will be collected a buffy layer 28 which comprises substantially all of the leukocytes or white cells of the sample and some platelets. Above the buffy layer 28 will be the clear plasma and anticoagulant in solution, indicated at 30. In the lower end of the upper tube part 24, on the other hand, will be collected a layer of platelets 32 and above this layer will be the plasma and anticoagulant solution from which the platelets have been separated.

The two parts 12 and 24 of the tube 10, after this high-speed centrifuging, may be arranged as shown in FIG. 4 in end-to-end relation and preferably placed in a precision sighting and measuring device (not shown) like that disclosed in copending Brown application Serial No. 763,083. By use of such apparatus, very exact measurements as to the relative length of the several different parts of the centrifuged sample in the two tube portions may be made. When the two tube portions are in place, the measuring apparatus will be adjusted so that the cross-hair of the microscope thereof will coincide substantially with the base of the column 26 of red cells while the control arm of the apparatus is at its zero position on the measuring scale of the apparatus and also the apparatus will be adjusted so that said cross-hair will coincide substantially with the upper end of the plasma-anticoagulant solution 34 in the upper tube part 24 when the control arm has been moved to its 111% position on the measuring scale.

In practice, it has been found that since the thickness of the flame-sealed end 21 of the tube portion 24 may vary somewhat and since the increase in total specimen length due to this thickness may be easily measured, it is well at this time to measure, on the micrometer eyepiece scale of the microscope, this small extra amount, as indicated by $a$ between the upper end of the tube portion 12 and the mean level of the base of the material 32 in the upper tube portion 24. This value $a$ may then be allowed while making the 111% adjustment $b$ of the instrument, this allowance being such as to bring point 36 for the 111% adjustment of the instrument at a distance equal to $a$ below the top of the mixture 34 into alignment with the cross-hair of the instrument.

Thereafter, all measurements for the different component parts of the specimen in the two portions 12 and 24 will be percentage volumes of the total blood specimen. By making five measurements, a determination of the percentage volume of erythrocytes, leukocytes, and platelets in the original blood sample or specimen can be readily computed. The five scale readings are: the distance $c$ from the base of the erythrocyte column 26 to the top of the platelet layer 32; the distance $d$ which is the thickness of the platelet layer 32; the distance $e$ from the upper end of the lower tube 12 to the top of the buffy layer 28; the distance $f$ which is the thickness of the buffy layer 28 (formed mainly by leukocytes and platelets); and the distance $g$ for the length of the erythrocyte column 26.

Even though some material might escape from the upper end of the lower tube 12, as indicated by the curvature of the meniscus 37, due to loss or evaporation, nevertheless, no error in measurement will occur when the upper end of the lower tube is used since this will be a true measure of the material in the tube at the time of the severing thereof. Also, as stated previously, no appreciable loss of material will occur in the upper tube.

Portions 30 and 34, at this time, comprise only plasma and anticoagulant solution. The volume in part 34, however, is equal to $b+a-c$. Thus, the total volume of plasma and anticoagulant in both two parts will be equal to $b+a-c+e$.

Or plasma only will be equal to $$b+a-c-10\% \qquad (1)$$

While the platelet volume in part 32 can be measured directly, the platelet volume in buffy coat 28 formed by leukocytes and platelets must be calculated and added to the volume at 32 to get the total platelet volume. Since it may be considered that the platelet volume in part 28 will be in the same ratio to the plasma in part 30 as the measured platelet volume in part 32 bears to the plasma-anticoagulant mixture in part 34 (the platelets having been driven out of both plasma and the anticoagulant mixtures simultaneously by the high-speed centrifuging of the sample), the percentage platelet volume in layer 28 can be expressed as follows:

$$\frac{e \times d}{a+b-c} \qquad (2)$$

Thus, the total percentage platelet volume for the specimen will be:

$$d + \frac{e \times d}{b+a-c} \qquad (3)$$

The leukocyte volume may be expressed as follows:

$$f - \frac{e \times d}{b+a-c} \qquad (4)$$

The value for percentage of erythrocytes will be equal to $g$.

The same blood analysis information may be obtained with as high or even higher accuracy and without the necessity of breaking the microhematocrit tube by the slightly different method steps which follow: and this procedure may be preferred if a somewhat larger quantity of whole blood is available.

Slow centrifuging of a somewhat larger quantity of whole blood, to which 10% of liquid anticoagulant has been added, will be done at approximately 800 to 1000 r.p.m. for a period of approximately eight to ten minutes using a culture tube or the like. At this time, the tube will be held in such a tilted position that the direction of the resulting force due to both gravity and rotation of the centrifuge combined will be substantially parallel to the longitudinal axis of the tube, and thus collecting of cells upon the side walls of the tube will be minimized or avoided. This slower speed and relatively longer period of centrifuging tends to more completely separate the red and white cells from the plasma and anticoagulant solution without causing platelets to settle in the liquid.

Thereafter, two standard microhematocrit tubes will be prepared for high-speed centrifuging. One microhematocrit tube (tube 40 in FIG. 5) will be supplied with a blood sample like that used in the culture tube and the other microhematocrit tube 42 in FIG. 6 will be loaded with a suitable quantity of the plasma and anticoagulant solution taken from the culture tube after the slow-centrifuging thereof. At this time, of course, the platelets will be in suspension in the liquid in tube 42. The two tubes 40 and 42 are then placed in a high-speed centrifuge and rotated at 12,000 r.p.m. for a period of approximately five minutes.

The result will be that all of the red cells in tube 40 will be packed into the lower end of the tube, as indicated by column 44, and immediately above this column will be a buffy layer 46 comprising white cells and platelets. A quantity of plasma and anticoagulant 48 will be contained above the layer 46. In the bottom of the tube 42 after high-speed centrifuging, on the other hand, will be a layer 50 of platelets and above this layer will be the clear plasma and anticoagulant solution 52. (If these filled tubes which have been centrifuged at high speeds are to be stored for any length of time, a plasticene clay may be used to close their open ends and thereby avoid losses due to evaporation.)

The tubes 40 and 42 will then be placed in the precision sighting and measuring apparatus mentioned above for measurements. After proper adjustment of the apparatus to align the opposite ends of the sample in each tube with the cross-hair of the microscope for the zero position and the 111% positions of the control arm of the apparatus, the height $h$ of the erythrocyte column 44, the distance $i$ from the base of the column to the top of the buffy layer 46 and the thickness $j$ of the buffy layer will be measured. In aligning the cross-hair of microscope with the lower end of the sample in the tube, it is always advisable, if the lower end portion of the tube chamber is other than flat, to set the cross-hair of the microscope as closely as possible to a mean transverse section of the tube at which location the volume of sample below the section will be just equal to the loss in volume above the section due to the narrowing down of the chamber. For example, if the interior of the closed lower end of the tube is the shape of an inverted cone, the mean transverse section will be at approximately two-thirds of the distance from the tip to the base of the cone.

Only the direct measurement $h$ for the erythrocyte percentage volume of the blood sample can be used without change. Other values for the percentage volume of leukocytes, of platelets and of plasma must be computed.

It will be clear from FIG. 5 that the fractional value for the amount of plasma in the plasma-anticoagulant solution 48 is equal to $$\frac{100-i}{111-i} \quad (5)$$

The platelet volume in the buffy layer 46, however, must be computed and this may be done as follows:

The plasma height of the solution 52 if the liquid anticoagulant were not present in tube 42 is equal to:

$$\left(\frac{100-i}{111-i}\right) \times (111-k) \quad (6)$$

The fractional volume of platelets at 50 which have been separated from the plasma in tube 42 will be:

$$(k) \div \left(\frac{100-i}{111-i}\right) \times (111-k)$$

or $$\frac{k(111-i)}{(100-i)(111-k)} \quad (7)$$

It is then necessary to multiply this fractional value for platelets by the value of the plasma at 48 in the whole blood, $100-i$, to get the percentage value for the platelets in the whole blood which equals:

$$\frac{k(111-i)}{(111-k)} \quad (8)$$

The percentage volume of leukocytes at 46 in the whole blood then will be equal to:

$$\left[j - \frac{k(111-i)}{(111-k)}\right] \quad (9)$$

It is possible to avoid the drudgery of solving the above equations by forming a Z-type graph, as shown in FIG. 7, and calibrating the different parts of this graph to the reference line 54 with values for $i$, $k$ and $j$ in such a manner that the percentage volume for leukocytes and for platelets may be easily obtained directly therefrom. At the left side of the graph, it will be noted, a vertical line 56 has been designated for values of $(111-i)$ above the reference line 54. The portion of this vertical line below the reference line 54, on the other hand, has been indicated for the value of $i$ which is more convenient to enter the value $(111-i)$. Also, a vertical line 58 at the right side of the chart has been arranged to represent values of $j$ with the part above the reference line 54 equal to leukocytes and the part below equal to platelets. A diagonal line 59 extends from the top of line 56 to the bottom of line 58. Thus, that part of line 59 above reference line 54 in FIG. 7 represents values of $(111-k)$ while that part below represents values for $k$. Obviously, $(111-k)$ and $(111-i)$, on the one hand, and $k$ and the platelet volume, on the other, constitute corresponding sides of similar triangles.

Such a Z-graph when made a part of a reader of suitable design and arrangement may be used to eliminate the necessity of the arithmetic which would otherwise be needed in solving the above equations. Accordingly, there is shown in FIG. 8 apparatus in the form of a reader having a light box portion 62 provided with a translucent plastic cover portion 64. Illumination means, not shown but of conventional type, is contained within the box and a switch and electrical lead for connection to an outside source of energy are indicated at 66 and 68 respectively. A nomogram, which has been calibrated for a 10% liquid anticoagulant in the blood sample, has been applied to a transparent plastic plate 70 shown operatively attached by the screws 71 to the top of a light box 62. Formed along the left side of the cover 64 is a guide groove 74 and along its right side in parallel relation thereto is a second guide groove 76.

Upon the plate 70 and adjacent groove 74, there is provided a vertical scale A with suitably spaced divisions from 10 to 80% reading in an upward direction to represent erythrocyte plus buffy layer volume values $i$. Upon plate 70 and adjacent the right-hand guide groove 76 is provided another scale C reading in an upward direction and calibrated to indicate percentage values of platelet volume in the blood adjacent the lower part of the scale and to indicate buffy layer volumes at the upper part thereof. A diagonal scale B extends from the point of zero value on the right-hand scale to the position of the zero value for plasma at the pivot point of a movable arm 90 and this scale is graduated to indicate platelet column height $k$ in the plasma-anticoagulant column 52.

A slider 78 is arranged to travel in the left-hand groove 74 and pivotally carries a transparent arm 90 having a reference line 90A corresponding to line 54 in FIG. 7 thereon. A reference line 78A, on the slider 78 and in line with the pivotal axis of arm 90, serves to position the end of the reference line 90A relative to scale A. Arranged to slide in the other groove 76 at the right side of the reader is a second slider 92 having a calibrated scale D for percentage volume of leukocytes thereon. This slider carries a reference arrow 92A and the graduated scale thereon extends in a downward direction therefrom.

To obtain platelet and leukocyte values from the reader in an accurate and rapid manner, the reference line 78A on the slider 78 is first set opposite the value on scale A corresponding to the erythrocyte-plus-buffy layer reading $i$ already obtained. The arrow 92A adjacent the zero value scale D is then brought into alignment with the proper value $j$ upon the buffy layer and platelet scale C. After these settings have been made, the reference line 90A is swung so as to overlie the proper value $k$ for the platelet reading on scale B to complete the settings for the reader. Thereafter, percentage values for the platelet volume and for the leukocyte volume in the blood sample may be read directly on scales C and D at locations where reference line 90A crosses.

Although preferred embodiments of my invention have been disclosed, it will be understood that modifications thereof may be made within the spirit and scope of the invention as defined by the appended claims.

Having described my invention, I claim:

1. Apparatus for use in determining the relative proportions of leukocytes and platelets in a blood sample, said apparatus comprising a panel having first and second graduated scales disposed in parallel spaced relation thereon, said first scale being graduated to indicate proportional values for the combined volume of erythrocytes, leukocytes and platelets of said sample, said second scale being graduated to indicate proportional values for the combined leukocytes and platelet volume of said sample, a diagonal scale so disposed upon said panel as to connect, in effect, the zero value for said second scale to the 100% value of said first scale, said diagonal scale being graduated to indicate proportional values of platelets in plasma for said blood sample after the erythrocytes and leukocytes have been separated therefrom, a movable scale adapted to be placed at various opposite positions adjacent said second scale, and having the graduation thereon indicating in a direction opposite to the second scale leukocyte values for said sample, and a movable member having a straight reference line thereon adapted to be swung to various positions of adjustment overlying said diagonal scale and said second scale and the movable scale adjacent thereto while its opposite end portion is disposed adjacent a selected value upon said first scale, whereby a value for leukocyte volume will be indicated by said reference line upon said movable scale when said reference line has been adjusted to a proper position overlying said first scale and when said movable scale has been adjusted into proper position adjacent said second scale in accordance with the relative volumes indicated by a centrifuged blood sample, and said reference line has been swung about its point of adjustment at said first scale and relative to said diagonal scale.

2. Apparatus for use in determining the relative proportions of leukocytes and platelets in a blood sample, said apparatus comprising a panel having first and second guideways disposed in fixed spaced relation thereon, a scale adjacent each guideway, the scale for said first guideway being graduated to indicate proportional values for the combined volume of erythrocytes, leukocytes and platelets of said sample, the scale for said second guideway being graduated to indicate proportional values for the combined leukocyte and platelet volume of said sample, a diagonal scale so disposed upon said panel as to connect, in effect, the zero value for the second guideway scale to the one hundred percent volume of the first guideway scale, said diagonal scale being graduated to indicate proportional values of platelets in plasma for said blood sample after the erythrocytes and leukocytes have been separated therefrom, first and second slidable members associated with said first and second guideways, respectively, said first slidable member being movable to various operative positions relative to said first guideway scale, and having an elongated reference arm pivotally carried thereby, said second slidable member being movable to various operative positions relative to said second guideway scale, and having a graduated scale thereon indicating in a direction opposite to the second guideway scale leukocyte values for said sample, said reference arm being swingable to various positions of adjustment overlying said diagonal scale and the leukocyte volume will be indicated by said arm upon the scale on said second member when said second member has been adjusted into proper positions in accordance with the relative volumes indicated by a centrifuged blood sample, and said arm has been adjusted into proper position relative to said diagonal scale.

3. Apparatus for use in determining the relative proportions of leukocytes and platelets in a blood sample, said apparatus comprising a panel having first and second guideways disposed in fixed spaced relation thereon, a scale adjacent each guideway, the scale for said first guideway being graduated to indicate proportional values for the combined volume of erythrocytes, leukocytes and platelets of said sample relative to the total volume of said sample, the scale for said second guideway being graduated to indicate proportional values for the buffy layer comprising the leukocyte and platelet volumes of said sample combined, a diagonal scale so disposed upon said panel as to connect, in effect, the hundred percent point of the first guideway scale and the zero point of the second guideway scale, said diagonal scale being graduated to indicate proportional values for platelets in plasma for said blood sample after the erythrocytes and leukocytes have been separated therefrom, first and second slidable members associated with said first and second guideways respectively, said first member being movable to various operative positions relative to said first guideway scale, and having an elongated reference arm pivotally carried thereby, said second member being movable to various operative positions relative to said second guideway scale, and having a graduated scale thereon indicating in a direction opposite to the second guideway scale leukocyte values for said sample, said reference arm being swingable to various positions of adjustment overlying said diagonal scale and the leukocyte scale on said second member, the graduations of said leukocyte scale being of the same size as the graduations of said second guideway scale, whereby values for leukocyte and platelet volumes will be indicated by said arm upon the scale on said second member and upon the second guideway scale respectively when said first and second members have been adjusted into proper positions relative to said guideway scales and said arm has been adjusted into proper position relative to said diagonal scale.

4. Apparatus for use in determining the relative proportions of leukocytes and platelets in a blood sample, said apparatus comprising a panel having first and second guideways disposed in fixed spaced relation thereon, a scale adjacent each guideway, the scale for said first guideway being graduated in accordance with a predetermined percentage volume of liquid anticoagulant added to the sample and arranged to indicate proportional values for the combined volume of erythrocytes, leukocytes and platelets which have been separated by highspeed centrifuging from said sample, and the scale for said second guideway being graduated to indicate proportional values for the combined leukocyte and platelet volume of said sample, a diagonal scale so disposed upon said panel as to connect, in effect, the hundred percent point of the first guideway scale and the zero point of the second guideway scale, said diagonal scale being graduated to indicate proportional values of platelets in plasma for said blood sample after the erythrocytes and leukocytes have been separated by slow centrifuging thereof, first and second slidable members associated with said first and second guideways respectively, said first member being movable to various operative positions relative to said first guideway scale, and having an elongated reference arm pivotally carried thereby, said second member being movable to various operative positions relative to said second guideway scale, and having a graduated scale thereon indicating in a direction opposite to the second guideway scale leukocyte values for said sample when positioned according to the leukocyte plus platelet volume, said reference arm being swingable to various positions of adjustment overlying said diagonal scale and the leukocyte scale on said second member, the graduations of said leukocyte scale being of the same size as the graduations of said second guideway scale, whereby values for leukocyte and platelet volumes will be indicated by said arm upon the scale on said second member and the second guideway scale respectively, when said first and second members have been adjusted into proper positions in accordance with the relative volumes indicated by a centrifuged blood sample, and said arm has been adjusted into proper position relative to said diagonal scale.

5. Apparatus for use in determining the relative proportions of leukocytes and platelets in a blood sample to which a predetermined amount of liquid anticoagulant has been added, said apparatus comprising a panel having first and second guideways disposed in fixed spaced relation thereon, a scale adjacent each guideway, the scale for said first guideway being graduated to indicate proportional values for the combined volume of erythrocytes, leukocytes and platelets of said sample, the scale for said second guideway being graduated to indicate proportional values for the combined leukocyte and platelet volume of said sample, a diagonal scale so disposed upon said panel as to connect, in effect, the upper end of the first guideway scale at a point including the percentage volume of anticoagulant added to said sample with the opposite end of the other guideway scale, said diagonal scale being graduated to indicate proportional values of platelets in plasma and anticoagulant for said blood sample, first and second slidable members associated with said first and second guideways respectively, said first member being movable to various operative positions relative to said first guideway scale, and having an elongated reference arm pivotally carried thereby, said second member being movable to various operative positions relative to said second guideway scale, and having a graduated scale thereon indicating in a direction opposite to the second guideway scale leukocyte values for said sample, said reference arm being swingable to various positions of adjustment overlying said diagonal scale and the leukocyte scale on said second member, the graduations of said leukocyte scale being of the same size as the graduations of said second guideway scale, whereby values for leukocyte and platelet volumes will be indicated by said arm upon the scale on said second member and upon the second guideway scale respectively when said first and second members have been adjusted into proper positions relative to said guideway scales and said arm has been adjusted into proper position relative to said diagonal scale.

References Cited by the Examiner

UNITED STATES PATENTS

| | | | |
|---|---|---|---|
| 2,076,439 | 4/1937 | Young | 235—61 |
| 2,666,577 | 1/1954 | Parker | 235—61 |
| 2,906,025 | 9/1959 | Drummond et al. | 33—75 |

FOREIGN PATENTS 989,627   5/1951   France.

LOUIS J. CAPOZI, *Primary Examiner.*